United States Patent
Haar

(10) Patent No.: US 10,822,176 B2
(45) Date of Patent: Nov. 3, 2020

(54) METHOD FOR TRANSPORTING MANUFACTURED PRODUCTS

(71) Applicant: Saeta GmbH & Co. KG, Wedel (DE)

(72) Inventor: Thomas Haar, Halstenbek (DE)

(73) Assignee: Saeta GmbH & Co. KG, Wedel (DE)

( * ) Notice: Subject to any disclaimer, the term of this patent is extended or adjusted under 35 U.S.C. 154(b) by 0 days.

(21) Appl. No.: 16/682,370

(22) Filed: Nov. 13, 2019

(65) Prior Publication Data

US 2020/0148482 A1  May 14, 2020

(30) Foreign Application Priority Data

Nov. 13, 2018 (DE) .................. 10 2018 128 348

(51) Int. Cl.
*B65G 47/08* (2006.01)
*B65G 43/08* (2006.01)
*B65G 47/29* (2006.01)

(52) U.S. Cl.
CPC ............ *B65G 47/08* (2013.01); *B65G 43/08* (2013.01); *B65G 47/295* (2013.01); *B65G 2205/04* (2013.01)

(58) Field of Classification Search
CPC ....... B65G 47/08; B65G 47/295; B65G 43/08
See application file for complete search history.

(56) References Cited

U.S. PATENT DOCUMENTS 3,485,339 A * 12/1969 Miller ................ B65G 47/31
  198/460.1
4,507,908 A    4/1985 Seragnoli
4,724,946 A * 2/1988 Cinotti ............... B65G 47/31
  198/419.2
4,729,105 A * 3/1988 Thompson ........... B65G 43/08
  198/341.06

FOREIGN PATENT DOCUMENTS

| DE | 6903216 | 10/1970 |
| DE | 3206645 A1 | 9/1982 |
| DE | 29804640 U1 | 6/1998 |
| DE | 10300642 A1 | 7/2004 |
| WO | 2015/179722 A1 | 11/2015 |

OTHER PUBLICATIONS

EP 19208308.7; filed Nov. 11, 2019; European Search Report dated Mar. 30, 2020 (5 pages).

* cited by examiner

*Primary Examiner* — William R Harp
(74) *Attorney, Agent, or Firm* — Barclay Damon LLP

(57) ABSTRACT

A method for transporting manufactured products from a first production machine to a second production machine via a conveying apparatus comprises receiving, at one end of the conveying apparatus, manufactured products produced by the first production machine. The manufactured products are transported at a speed of the conveying apparatus. The manufactured products are spaced apart from each other along the conveying apparatus such that an empty space is created between each manufactured product. The first production machine is stopped in response to a stoppage of the second production machine and the conveying apparatus is actuated to a second operating state that is configured to allow a manufactured product last output by the first production machine prior to the stop to be received by the conveying apparatus in the empty space nearest to the first production machine. The conveying apparatus is then stopped.

10 Claims, 2 Drawing Sheets

METHOD FOR TRANSPORTING MANUFACTURED PRODUCTS

CROSS REFERENCE TO RELATED INVENTION

This application is based upon and claims priority to, under relevant sections of 35 U.S.C. § 119, German Patent Application No. 10 2018 128 348.2, filed Nov. 13, 2018, the entire contents of which are hereby incorporated by reference.

BACKGROUND

The invention relates to a method for transporting manufactured products from a first production machine to a second production machine by means of a conveying apparatus, the first and second production machines being operated in a clocked manner or a cyclic manner. A clocked manner or a cyclic manner refers to the time it takes for a production machine to complete a production step. The manufactured products produced in the first production machine being fed to the conveying apparatus, the manufactured products being taken along by the conveying apparatus and being forced to travel at the speed of the conveying apparatus along the conveying route of the conveying apparatus and the manufactured products being fed to the second production machine by means of the conveying apparatus in a clocked manner and in the correct position (for being picked up).

The first and second production machine may for example be first and second cupping presses. The manufactured products may accordingly be cups. For example, in the manufacture of two-part cans consisting of a cupped lower portion and a lid, cup-shaped first draws are produced in a first cupping press, which are then transported to a second cupping press in which another cupping process for producing the final cup shape takes place. Sometimes, only a cutting procedure takes place in the second cupping press. The cups coming from the first cupping press often comprise a circumferential flange such that the opening of said cups can later be closed with the lid. The flange is used for connection to the lid, for example in a flanging process.

It is known to transport the cups by means of jets from the first cupping press to the second cupping press. A plurality of blowout nozzles arranged along the conveying route of the cups is provided, which outlet nozzles each blow out a stream of air that pushes the cups along the conveying route. Often, a queue of cups is produced prior to them being fed to the second cupping press. This serves to simplify synchronization of the cupping presses and to compensate for any idle strokes (strokes of the cupping press during plate changes that produce no cups). Compared with belt conveyors, for example, jets have the advantage of causing no abrasion to the adjoining flanges of the cups in a queue. However, jets have to be equipped with costly cup guides in order to prevent the cups from flying away. This not only incurs costs, but also makes it necessary to make precise adjustments to the relevant cup dimensions.

Since the cups are generally blown out of the first cupping press, they are traveling at a not insignificant speed, which may lead to deformations when they strike the end of the queue. Therefore, cup brakes are sometimes used, for example slowly rotating wheels having a soft or brush-like surface that slow the cups down. Subsequently, however, the cups accelerate again until they strike the end of the queue. This collision with the end of the queue and the unavoidable relative movement of the cups with respect to one another during the jerky advancement within the queue can cause damage to the generally already lacquered surface of the cups, in particular because the sharp flange edge, which is also the cutting edge at which the blank was cut in the first cupping press, inevitably rubs against the outer wall of the neighboring can in the queue. Thus far, no satisfactory solution has been proposed for this problem.

Moreover, the cups have to be separated in order to be passed from the queue to the second cupping press, such that they arrive at the right place at the right time in order to be reliably gripped by the transfer system of the second cupping press, generally a gripper feed system or the like. These separation stations consist of screw conveyors or controlled pins. These components have to be precisely adjusted to the relevant cup dimensions or even custom-made. This also incurs undesirably high costs.

Complete synchronization between the first and second cupping press is difficult and, in the event of incomplete synchronization, leads to jittering. Furthermore, for various reasons, for example in the event of a malfunction, the second cupping press can stop suddenly by itself. The cups coming from the first cupping press are, as explained above, fed to the second cupping press in a clocked manner. For example, if it takes five (5) seconds for the first cupping press to produce a cup, then the second cupping machine would be fed a cup produced from the first cupping machine every five (5) seconds. A sudden stop of the second cupping press therefore creates the problem of a cup recently ejected by the first cupping press during the clocked advancement no longer being able to be received by the conveying apparatus, which would also have stopped in this case. This leads to cup congestion, it potentially being necessary to remove the surplus cup from the production line manually before production can start up again.

The object of the invention is to provide a method of the type mentioned at the outset by means of which cups can be transported between a first and a second production machine in a reliable manner at all times.

BRIEF SUMMARY OF THE INVENTION

The invention solves the object for a method of the type mentioned at the outset in that the conveying apparatus takes the manufactured products along at a distance from one another such that a free space (or an empty space) for receiving at least one other manufactured product is left between neighboring manufactured products, and in that, in the event of a (sudden) stop of the second production machine, the first production machine is also stopped and the conveying apparatus is actuated or otherwise put into a second state to allow the manufactured product last output by the first production machine prior to the stop is received by the conveying apparatus in the free space nearest to the first production machine and the conveying apparatus is then also stopped.

The first production machine may be a first cupping press and the second production machine may be a second cupping press. The manufactured products may accordingly be cups. According to the invention, the first production machine, for example the first cupping press, and the second production machine, for example the second cupping press, are in particular operated synchronously with one another. They are in particular synchronized at least in terms of the speed thereof, preferably in terms of the speed and phase thereof. The conveying apparatus may be a conveyor belt. As mentioned at the outset, a blank may be cut in the first cupping press and a cup, in particular a first-draw cup, may be produced from said blank in a cupping process. The second cupping press downstream of the first cupping press may then carry out an additional cupping procedure on the cups or merely a cutting procedure. At least one conveyor belt, in particular an endless conveyor belt, may be provided for transporting the cups from the first cupping press to the second cupping press. The conveyor belt then sets the speed of the cups along the conveying route, in particular along the entire conveying route. The cups which arrive onto the conveyor belt, for example by being blown out, from the first cupping press typically at a higher speed than the conveyor belt are initially slowed down by the conveyor belt to the speed of the conveyor belt and then conveyed along the conveying route at the speed of the conveyor belt. As already explained, the cups may in particular comprise a circumferential flange such that the opening of said cups can later be closed with a lid. The invention can also easily transport cups of different dimensions and shapes without this impairing functioning.

According to the invention, the manufactured products are conveyed by the conveying apparatus such that, at least at the start of their conveying path on the conveying apparatus, a free space for receiving at least one additional manufactured product is left between neighboring manufactured products. These free spaces created between neighboring manufactured products remain free during normal operation, i.e., when the first and second production machines are operating properly. If the second production machine automatically comes to a sudden stop, and thus the conveying apparatus and the first production machine also come to a stop, a manufactured product last ejected by the first production machine prior to the stop can be received by said free space and thus still be passed from the first production machine to the conveying apparatus without there being a malfunction. When the second production machine starts up again after the stop, the relevant manufactured product can then be processed thereby without any product having to be removed from the production line. Therefore, according to the invention, in the event of a sudden stop of the second production machine, all manufactured products can be processed without there being a malfunction or without manual intervention in the production operation being necessary. By virtue of the invention, the manufactured products can therefore be transported reliably between the first and second production machine at all times and even in the event of a sudden stop of the second production machine.

According to one embodiment, when the second production machine starts up again after a (sudden) stop, the conveying apparatus is also started up again, the conveying apparatus being actuated such that when the manufactured product received in the free space reaches the second production machine, said manufactured product is fed to the second production machine in accordance with the cycle of the second production machine. The speed and/or conveying path of the conveying apparatus is then altered when the manufactured product received in the free space reaches the second production machine, such that said manufactured product is also fed to the second production machine for processing within the normal cycle thereof. The anomaly on the conveying apparatus created by the manufactured product received in the free space is accordingly eliminated in the normal operation of the second production machine.

In order to prevent another anomaly from arising at the start of the conveying route on account of manufactured products output by the first production machine, according to another embodiment, the first production machine can be started up again only if the manufactured product received in the free space has been fed to the second production machine by the conveying apparatus.

According to the invention, it is also possible for neighboring manufactured products not to touch one another along the entire conveying route of the conveying apparatus, for example because the free space according to the invention between neighboring manufactured products is maintained over the entire conveying route. Damage to the lacquer coating of the manufactured products is thus reliably excluded.

According to an embodiment, the conveying apparatus may carry out at least two conveying steps during each work cycle of the first and second production machine in normal operation, i.e., when the first and second production machine are running properly. As a result, a manufactured product can be received in a free space and later passed on to the second production machine in a particularly simple manner, in that the conveying apparatus carries out only one of the two conveying steps in each case for this purpose.

But it is also possible for the conveying apparatus to carry out (exactly) one conveying step during each work cycle of the first and second production machine in normal operation, i.e., when the first and second production machine are running properly. Said conveying step is then large enough to create the free spaces according to the invention. The conveying apparatus can carry then out a correspondingly shortened conveying step each time a manufactured product is received in a free space and later passed on to the second production machine.

The manufactured products can be fed by means of the conveying apparatus to a pass-on station in order to be passed on to the second production machine. A transfer apparatus, which conveys the manufactured products, for example to the pass-on station, such that they are passed on to the second production machine, may also adjoin the conveying apparatus.

The conveying apparatus, for example the conveyor belt, may be driven by one or more servo drives. The speed of servo drives can be controlled in a particularly simple and precise manner. The device can also be designed to have multiple channels. In this case, a plurality of parallel conveying apparatuses configured according to the invention are provided, which can be individually controlled in each case in the manner according to the invention. It should be understood that all of the embodiments of the invention described above and below in relation to a multi-channel device, which therefore comprises a plurality of parallel conveying apparatuses, can also be provided for each of the conveying apparatuses.

According to another embodiment, the position of the manufactured products can be detected in each case at least one location along the conveying route of the conveying apparatus. It is therefore also possible for the speed of the conveying apparatus to be adjusted in each case depending on the relevant detected position of the manufactured products such that the manufactured products are fed to the second production machine synchronously with the work cycle of the second production machine. The conveying apparatus can thereby be driven at a variable speed, as a result of which the manufactured products can also be moved along the conveying route at a correspondingly variable speed. On account of said variable speed setting, the manufactured products can be passed on to the second production machine largely independently of the work cycle of the first production machine and thus regardless of the point in time at which they exit the first production machine. The position of the manufactured products on the conveying apparatus is fixed along the conveying route, in particular along the entire conveying route. In this embodiment, at least one detector, for example an optical detector, is provided for synchronizing the conveying apparatus, in particular the feeding of the manufactured products, with the work cycle of the second production machine. By means of the detector, the position of each manufactured product is detected, in particular it is detected when a manufactured product reaches and/or leaves a particular position along the conveying route. On this basis, the distances between neighboring manufactured products, which may vary for different reasons, are known for the purpose of controlling the conveying apparatus. On this basis, the conveying apparatus can be actuated in each case such that the manufactured products are fed to the second production machine at the right point in time, i.e., synchronously with the work cycle of the second production machine. The formation of a queue of manufactured products upstream of the second production machine is therefore not required. Instead, the conveying apparatus brings each and every manufactured product into the correct pass-on position at the right time by means of corresponding control synchronous with the movement of the second production machine. The speed of the conveying apparatus may vary frequently in this embodiment. The conveying apparatus can stop, move in a uniform manner or be (positively or negatively) accelerated. The movement of the conveying apparatus can thereby be determined by the work cycle of the second production machine and the position of the manufactured products on the conveying apparatus. In principle, it is possible for the manufactured products to initially be fed to a transfer system by the conveying apparatus, by means of which transfer system said manufactured product is brought into a position for being passed on to the second production machine. On account of the above-mentioned embodiment, transportation for provision to the transfer system of the second production machine is made possible in a simple manner without the manufactured products touching one another. In particular, costly cup guides and the like are not required.

The manufactured products can be drawn onto the conveying apparatus by means of a plurality of suction openings on the conveying apparatus and thus forced to travel at the speed of the conveying apparatus. By applying a suitable negative pressure, the manufactured products are brought to the speed of the conveying apparatus in a particularly simple manner and it is substantially ensured that the manufactured products on the conveying apparatus cannot move relative to the conveying apparatus. If manufactured products made of a magnetic material are transported, it is also possible to pull the manufactured products onto the conveying apparatus and thus force them to travel at the speed of the conveying apparatus by means of magnetic force. In this case, corresponding magnets exerting a magnetic force on the manufactured products can be provided below the conveying apparatus. In this way, too, the manufactured products can be brought to the speed of the conveying apparatus such that they do not move relative to the conveying apparatus. In the two above-mentioned embodiments, the conveying apparatus may in particular be located below the manufactured products, which are therefore transported on top of the conveying apparatus.

According to an alternative embodiment, it is also possible for the conveying apparatus to press the manufactured products onto a slide surface and thus force them to travel at the speed of the conveying apparatus. In this case, the conveying apparatus is therefore located above the manufactured products and presses same onto the slide surface. The conveying apparatus uses friction to take the manufactured products along. In particular, the conveying apparatus can take the manufactured products along the conveying route in a sliding manner on the slide surface and thus force them to travel at the speed of the conveying apparatus by means of a rubberized or textured surface. This embodiment may for example be necessary if the manufactured products are cups in the form of redrawn, conical cans. These often have a very broad flange which tends to feature a pronounced undulation. This undulation can hinder the build-up of negative pressure, and therefore the cups cannot be suctioned reliably by means of suction openings, for example. The conveying apparatus in this case forms an upper belt which applies pressure from above onto the cups substantially over the entire conveying route.

According to another embodiment, the manufactured products can each be slowed down by the conveying apparatus at the end of the conveying apparatus and held in a pass-on position for being passed on to the second production machine. The pass-on position may still be on the conveying route of the conveying apparatus or it may be on a section immediately downstream of the conveying route of the conveying apparatus in the conveying direction of the manufactured products. As already explained, it is possible for said pass-on position to adjoin a transfer system which transports the manufactured products to a (another) pass-on position, from which they are passed on to the second production machine. However, it is also possible for the manufactured products to be taken up directly from the (first) pass-on position, for example by means of a gripper apparatus or the like, and fed to the second production machine.

The position of the manufactured products can in each case be detected at a location on the conveying route of the conveying apparatus that is spaced apart from the pass-on position at least by the braking distance required for slowing the manufactured products down to a standstill. In this way, it is ensured that there is still enough time to slow the detected manufactured product down to a standstill at the pass-on position after detection, for example of the front edge of a manufactured product, by means of the detector. The final position of the manufactured product in the pass-on position can be reached with the aid of a measuring system, in particular a NC measuring system, connected to the conveying apparatus. This makes possible a particularly simple fine adjustment of the pass-on position.

According to another embodiment, it is possible for the position of the manufactured products to be detected in each case at a first location on the conveying route of the conveying apparatus and at a second location on the conveying route of the conveying apparatus downstream of the first location in the conveying direction of the manufactured products. For example, the first detector in the conveying direction of the manufactured products can measure a distance between two successive manufactured products. The second detector in the conveying direction can then ascertain, for example, when the leading one of the two manufactured products detected in terms of the distance therebetween reaches the location of the second detector and the conveying apparatus can accordingly be controlled and slowed down such that this manufactured product is held in the pass-on position. Based on the knowledge of the distance from the next manufactured product, the conveying apparatus can be accelerated by the required extent after the first manufactured product has been passed on in order to feed the following manufactured product to the pass-on position in a timely manner once again. For example, in the case of a larger distance between neighboring manufactured products, a greater acceleration of the conveying apparatus can be selected than in the case of a smaller distance between neighboring manufactured products. If necessary, a large acceleration of the conveying apparatus can also be used to compensate for any idle strokes of the first production machine.

According to another embodiment, it is possible for the distance between successive manufactured products to be detected in each case at the start of the conveying route of the conveying apparatus and when a predetermined distance is exceeded, it is possible for the manufactured products to not be forced to travel at the speed of the conveying apparatus in an initial section of the conveying route immediately downstream of the start of the conveying route. As already explained, the manufactured products generally arrive onto the conveying apparatus from the first production machine at a high speed, for example by means of a blowout apparatus. In this embodiment, the manufactured products can slide along the initial section of the conveying route at a higher speed over the conveying apparatus than the speed of the conveying apparatus itself. After the end of the initial section, they are slowed down by the conveying apparatus and forced to travel at the speed of the conveying apparatus, which is generally lower. In this way, too, idle strokes of the first production machine or large distances between neighboring manufactured products caused by something else can be compensated. If, for example, a negative pressure apparatus comprising suction openings is used to suck the manufactured products onto the conveying apparatus, controllable negative pressure chambers arranged in the region of the initial section can be provided. The control apparatus can then deactivate or activate the negative pressure chambers in a targeted manner such that the manufactured products coming from the first production machine slide further or less far on the conveying apparatus. Accordingly, this is also possible using controllable magnets below the conveying apparatus in the region of the initial section. A pressure belt arranged above the manufactured products as the conveying apparatus can also be controlled in a corresponding manner.

BRIEF DESCRIPTION OF THE DRAWINGS

An exemplary embodiment of the invention is explained below in greater detail with reference to figures. Schematically.

The same reference numbers refer to the same objects in the figures unless indicated otherwise.

DETAILED DESCRIPTION OF THE INVENTION

Figure 1:
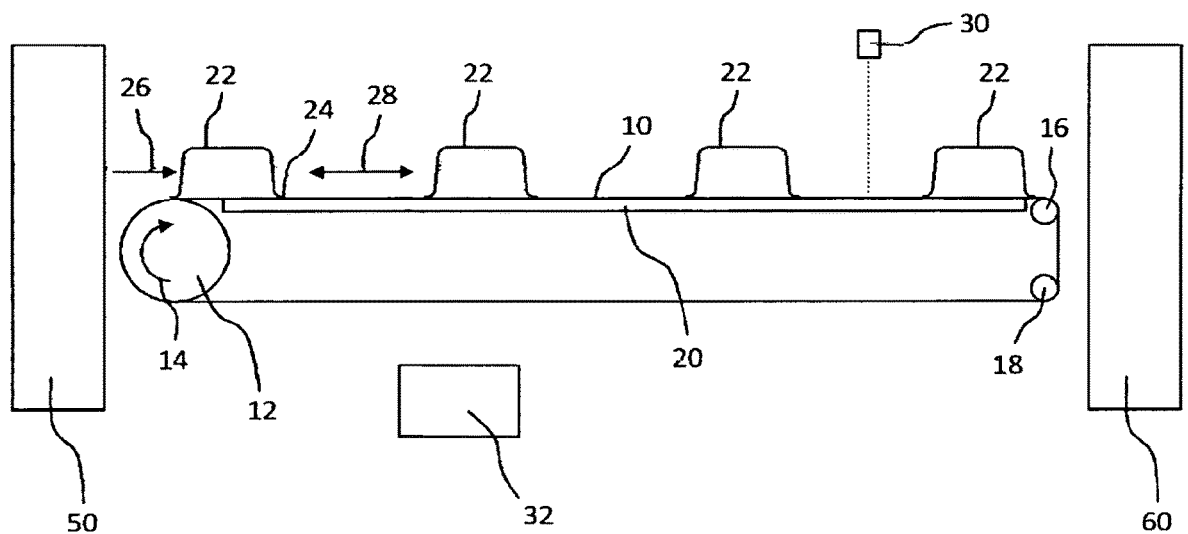
FIG. 1 shows a cross sectional view of an embodiment of a conveying apparatus in a first operating state.

The device shown in the figures comprises a conveying apparatus in the form of a conveyor belt 10. The conveyor belt 10 is an endless conveyor belt which is driven at one end by means of a drive pulley 12, as illustrated by the arrow 14. At the opposite end, the conveyor belt 10 travels over two deflection rods 16, 18, as a result of which a particularly small amount of space is taken up by the device at this end. The conveyor belt 10 has a plurality of suction openings (not shown in greater detail in FIG. 1) distributed over the entire surface thereof. A negative pressure apparatus 20 generates a negative pressure that acts via the suction openings on cups 22 as the manufactured products conveyed on the conveyor belt 10. The cups 22 each have a circumferential flange 24 by means of which they rest on the conveyor belt 10.

In the example shown, the cups 22 are produced in a very schematically represented first cupping press 50 as the first production machine, in that the first cupping press 50 initially cuts blanks out of a metal sheet and subsequently carries out a cupping procedure. The cups 22 are fed from the first cupping press 50 to the upper side of the conveyor belt 10 at a higher speed than the conveyor belt 10 by means of a blowout apparatus (not shown in greater detail), as illustrated by the arrow 26 in FIG. 1. The cups 22 are slowed down when they reach the conveyor belt 10 and forced to travel at the speed of the conveyor belt 10 by means of the negative pressure apparatus 20 and the suction openings in the conveyor belt 10. The conveyor belt 10 takes the cups 22 along at a distance from one another such that a free space for receiving at least one other cup 22 is left between neighboring cups 22, as illustrated by the arrow 28 in FIG. 1. The conveyor belt 10 can carry out two conveying steps during each work cycle of the first and second cupping press 50, 60.

In the example shown, the reference sign 30 denotes an optical detector which in each case optically detects the front edge of a cup 22 at a predetermined location on the conveying route along the conveyor belt 10. A control apparatus 32 receives the measurement data of the detector 30 and actuates the conveyor belt 10 via the drive pulley 12 based on this data such that the cups 22 are brought to a standstill in a pass-on position one after the other and in each case in a manner adapted to the work cycle of a second cupping press 60 as the second production machine downstream of the first cupping press 50. In FIG. 1, the cup 22 arranged furthest to the right is in said pass-on position.

The cups 22 can be fed in a clocked manner or according to the same cycle by means of the conveyor belt 10 to a pass-on station (not shown in greater detail) in order to be passed on to the second cupping press 60. For example, if the first machine produces a cup every five (5) seconds, then the second machine needs to operate in the same cycle or time (i.e. it needs execute the following production step in five (5) seconds to be ready to receive the next cup produced by the first machine) so that a production flow can be achieved. The first machine must thus run in cycle or in a clocked manner with the second machine. Accordingly, the conveying apparatus must thus also run in the same cycle or time. Specifically, the conveying apparatus must provide a cup that has been produced by the first machine to the second machine every five (5) seconds to maintain production flow. When the conveyor belt 10 is at a standstill for the purpose of the pass-on procedure, a gripper or the like can remove the cup 22 from the pass-on position and feed same to the second cupping press 60, be this directly or via a transfer system. On account of the small amount of space taken up by the deflection rods 16, 18, the gripper can remove the cups 22 directly from the conveyor belt 10. After a cup 22 has been removed from the pass-on position, the conveyor belt 10 is accelerated again by the control apparatus 32 via the drive pulley 12 and the next cup 22 is conveyed into the pass-on position and held there. In this way, the cups 22 are fed to the second cupping press in a manner synchronized to the work cycle thereof.

Figure 2:
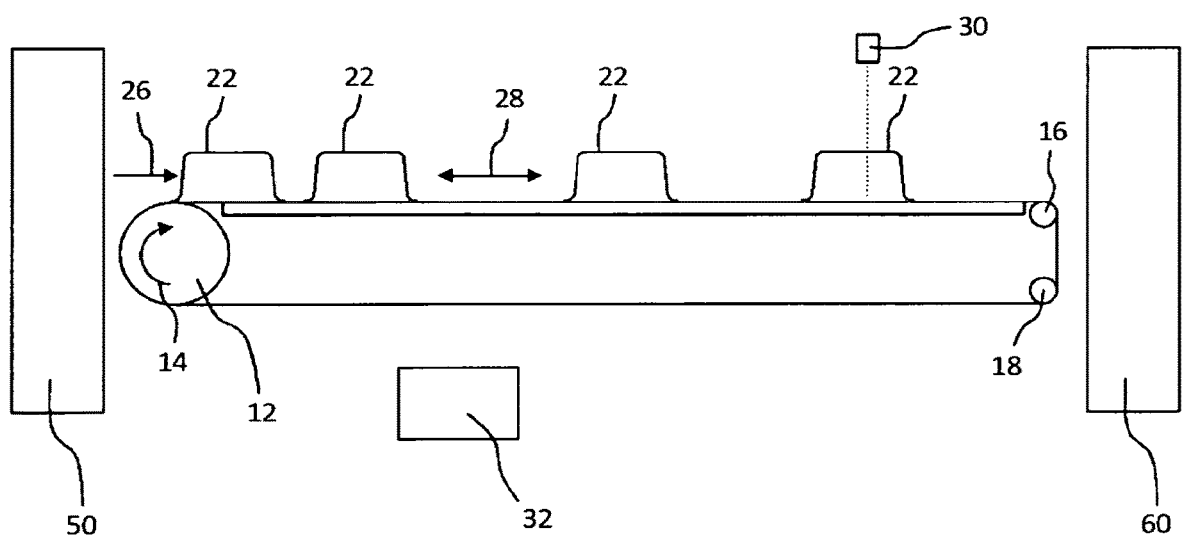
FIG. 2 shows the embodiment of the conveying apparatus from FIG. 1 in a second operating state.
Figure 3:
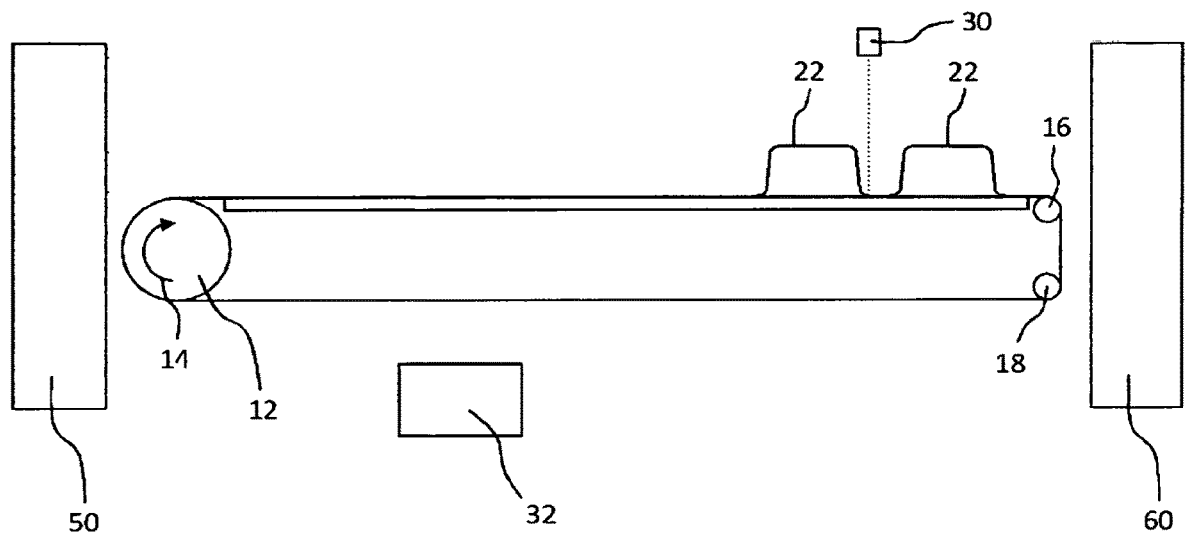
FIG. 3 shows the embodiment of the conveying apparatus from FIG. 1 in a third operating state.
Figure 4:
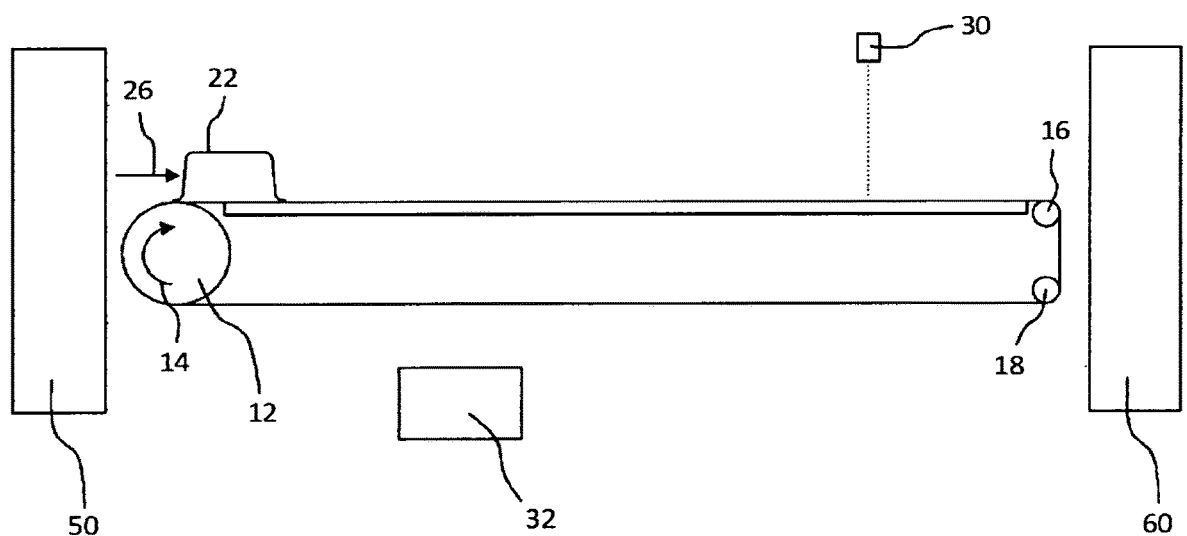
FIG. 4 shows the embodiment of the conveying apparatus from FIG. 1 in a fourth operating state.

If the second cupping press 60 comes to a sudden stop, the first cupping press 50 is also stopped and the conveyor belt 10 is actuated to a second operating state such that a cup 22 last output by the first cupping press 50 prior to the stop is received by the conveyor belt 10 in the free space 28 nearest to the first cupping press 50, as shown in FIG. 2. Subsequently, the conveyor belt is also stopped. When the second cupping press 60 starts up again, the conveyor belt 10 is also started up again, the conveyor belt being actuated to a third operating state (FIG. 3) such that when the cup 22 received in the free space 28 reaches the second cupping press 60, said cup 22 is fed to the second cupping press 60 in accordance with the normal cycle of the second cupping press 60. As a result, the anomaly on the conveyor belt 10 caused by the cup 22 received in the free space 28 is eliminated. In order to prevent another anomaly from occurring at the start of the conveying route of the conveyor belt 10 by means of cups output by the first cupping press 50, the first cupping press 50 is only started up again (in a fourth operating state as shown in FIG. 4, which may be the same as the first operating state) if the cup 22 received in the free space 28 has been fed to the second cupping press 60. This is shown in FIGS. 3 and 4, the cup 22 received in the free space 28 still being on the conveyor belt 10 in FIG. 3 and the restart, of the first cupping press 50 as well, only just having been effected in FIG. 4.

The device shown in the figures may comprise a plurality of identically configured parallel conveyor belts. Moreover, the other conveyor belts arranged in particular in parallel with the conveyor belt 10 shown may be configured in an identical manner to the conveyor belt 10 described in terms of the configuration and function thereof. The conveyor belt or belts 10 may be driven by servo drives. It should be understood that, instead of the negative pressure apparatus 20, other conveying means that convey the cups 22 along the conveying route could also be provided.

The invention claimed is:

1. A method for transporting manufactured products from a first production machine to a second production machine via a conveying apparatus, wherein the first and second production machines are operated in a clocked manner, the method comprising:
   receiving, at one end of the conveying apparatus, manufactured products produced by the first production machine;
   transporting the manufactured products at a speed of the conveying apparatus;
   spacing the manufactured products apart from each other along the conveying apparatus such that an empty space is created between each manufactured product;
   stopping the first production machine in response to a stoppage of the second production machine and actuating the conveying apparatus into a second operating state, wherein the second operating state is configured to allow a manufactured product last output by the first production machine prior to the stoppage to be received by the conveying apparatus in the empty space nearest to the first production machine; and
   stopping the conveying apparatus.

2. The method according to claim 1, wherein the first production machine is a first cupping press, the second production machine is a second cupping press, and the manufactured products are cups.

3. The method according claim 1, wherein the conveying apparatus is a conveyor belt.

4. The method according to claim 1, further comprising actuating the conveying apparatus to a third operating state when the second production machine starts up again, wherein the third operating state is configured to start the conveying apparatus, and wherein when the manufactured product received in the empty space reaches the second production machine, said manufactured product is fed to the second production machine in accordance with a cycle of the second production machine.

5. The method according to claim 4, further comprising starting the first production machine once the manufactured product received in the empty space has been fed to the second production machine by the conveying apparatus.

6. The method according to claim 5, wherein the conveying apparatus carries out at least two conveying steps during each work cycle of the first and second production machine.

7. The method according to claim 5, wherein the conveying apparatus carries out one conveying step during each work cycle of the first and second production machine.

8. The method according to claim 1, further comprising a pass-on station configured to pass the manufactured products from the conveying apparatus to the second production machine.

9. The method according to claim 1, further comprising detecting at least one position of the manufactured products along the conveying apparatus.

10. The method according to claim 9, further comprising adjusting a speed of the conveying apparatus depending on the at least one detected position of the manufactured products such that the manufactured products are fed to the second production machine synchronously with a work cycle of the second production machine.

* * * * *